(12) United States Patent
Towns

(10) Patent No.: US 11,213,762 B1
(45) Date of Patent: Jan. 4, 2022

(54) CUSTOMIZABLE TOY FIGURE INCLUDING A BOOK

(71) Applicant: Sylvia Towns, Philadelphia, PA (US)

(72) Inventor: Sylvia Towns, Philadelphia, PA (US)

( * ) Notice: Subject to any disclaimer, the term of this patent is extended or adjusted under 35 U.S.C. 154(b) by 0 days.

(21) Appl. No.: 16/451,148

(22) Filed: Jun. 25, 2019

(51) Int. Cl.
*A63H 3/28* (2006.01)
*G09B 5/00* (2006.01)
*A63H 3/40* (2006.01)
*A63H 3/48* (2006.01)
*G09B 19/00* (2006.01)

(52) U.S. Cl.
CPC ............... *A63H 3/28* (2013.01); *A63H 3/40* (2013.01); *A63H 3/48* (2013.01); *A63H 2200/00* (2013.01); *G09B 19/00* (2013.01)

(58) Field of Classification Search
CPC ...... A63H 3/28; A63H 2200/00; A63H 3/003; A63H 3/48; A63H 33/26; A63H 33/38; A63H 5/00; A63H 13/02; A63H 33/00; A63H 33/042; A63H 3/02; A63H 3/365; A63H 3/40; G09B 5/06; G09B 17/00; G09B 17/003; G09B 21/008; B42D 3/123
USPC ... 446/72, 81, 297, 298, 299, 301, 302, 317; 434/317
See application file for complete search history.

(56) References Cited

U.S. PATENT DOCUMENTS

| | | | | |
|---|---|---|---|---|
| 3,495,351 A * | 2/1970 | Bear | ............... | A63H 3/40 446/299 |
| 4,696,653 A * | 9/1987 | McKeefery | ............... | A63H 3/28 434/308 |
| 5,636,994 A * | 6/1997 | Tong | ............... | G09B 5/065 434/308 |
| 5,795,213 A * | 8/1998 | Goodwin | ............... | G09B 5/062 434/317 |
| 5,944,533 A * | 8/1999 | Wood | ............... | A63H 3/28 434/167 |
| 6,264,523 B1 * | 7/2001 | Simmons | ............... | A63H 3/28 434/169 |
| 6,320,591 B1 * | 11/2001 | Griencewic | ............... | H04L 69/329 345/582 |
| 6,697,602 B1 * | 2/2004 | Ferrigno | ............... | G09B 5/062 434/308 |
| 8,469,766 B2 * | 6/2013 | Zheng | ............... | A63H 3/28 446/175 |
| 8,960,936 B1 * | 2/2015 | Malcolm | ............... | B42D 3/123 345/901 |
| 9,400,601 B2 * | 7/2016 | Tecarro | ............... | G06F 3/0483 |
| 2004/0039750 A1 * | 2/2004 | Anderson | ............... | G06Q 10/10 |
| 2004/0191741 A1 * | 9/2004 | Ferrigno | ............... | G09B 5/062 434/309 |
| 2006/0103629 A1 * | 5/2006 | Seet | ............... | G06F 3/0483 345/156 |
| 2006/0148375 A1 * | 7/2006 | Leleu | ............... | A63H 3/003 446/327 |
| 2007/0087655 A1 * | 4/2007 | Rifkin | ............... | A63H 3/28 446/268 |
| 2007/0093169 A1 * | 4/2007 | Blaszczyk | ............... | A63H 5/00 446/147 |

(Continued)

*Primary Examiner* — Nini F Legesse

(74) *Attorney, Agent, or Firm* — The Iwashko Law Firm, PLLC; Lev Ivan Gabriel Iwashko

(57) ABSTRACT

A customizable toy figure, including a body, and a toy book disposed on at least a portion of the body to entertain a user with at least one story, such that the toy book is oriented in a first direction toward at least a portion of the body.

11 Claims, 1 Drawing Sheet

(56) References Cited

U.S. PATENT DOCUMENTS

2013/0095725 A1\* 4/2013 Von Mohr ............... A63H 3/48
  446/321
2014/0011423 A1\* 1/2014 Wong Simmons ...... A63H 3/36
  446/142

\* cited by examiner

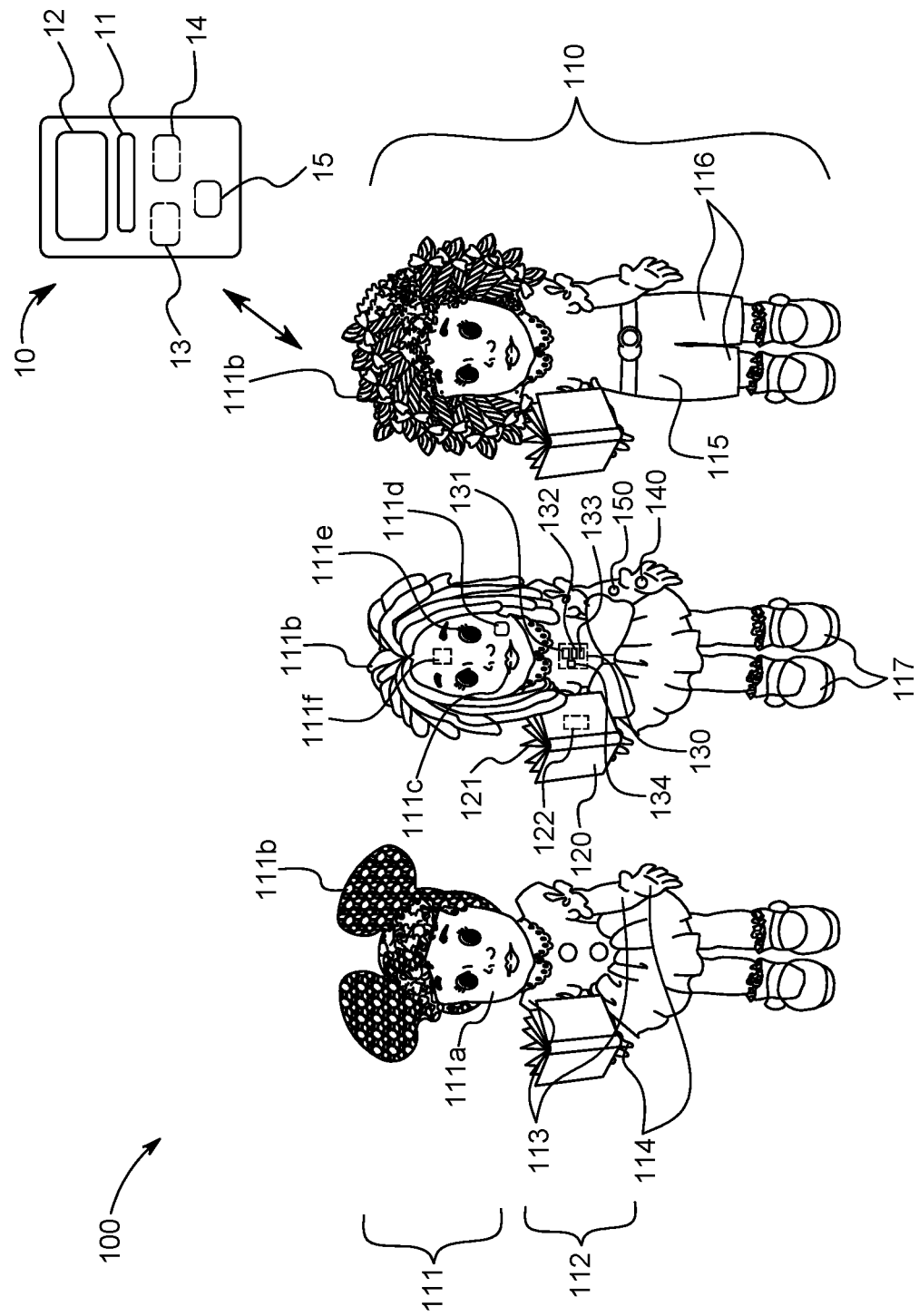

CUSTOMIZABLE TOY FIGURE INCLUDING A BOOK

BACKGROUND

1. Field

The present general inventive concept relates generally to a toy figure, and particularly, to a customizable toy figure including a book.

2. Description of the Related Art

For many children, there are few incentives that foster good reading habits as today's technologies have shifted attention of young minds to television and video games. Unfortunately, poor reading skills can hamper future growth and development. Good reading skills can stimulate creativity and expand a child's vocabulary.

Current products on the market targeted for young girls include dolls that have womanly features and wear inappropriate clothing. As such, many young girls have difficulty identifying with the dolls.

Therefore, there is a need for a customizable toy figure that includes a book to which young girls can identify and develop reading skills.

SUMMARY

The present general inventive concept provides a customizable toy figure including a book.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a customizable toy figure, including a body, and a toy book disposed on at least a portion of the body to entertain a user with at least one story, such that the toy book is oriented in a first direction toward at least a portion of the body.

The toy book may include a plurality of pages disposed within at least a portion of the toy book to display the at least one story thereupon.

The customizable toy figure may further include a toy book button disposed on at least a portion of the body to move at least one of the plurality of pages in response to the toy book button being depressed.

The toy book rotates to be at least partially oriented in a second direction in response to the toy book button being depressed.

The body may include a plurality of eyes disposed on at least a portion of the body, and a mouth disposed on at least a portion of the body.

Each of the plurality of eyes may include an OCR unit to perform OCR on each word of the story, such that the mouth utters the word in response to the OCR.

The body may further include an eye motor disposed within at least a portion of the body to at least partially move each of the plurality of eyes in response to a rotation of the eye motor.

The body may further include a jaw motor disposed within at least a portion of the body to at least partially move the mouth in response to a rotation of the jaw motor.

The toy book may include a display unit disposed within at least a portion of the toy book to display the at least one story thereupon.

The customizable toy figure may further include a toy book wheel disposed on at least a portion of the body to at least partially scroll content on the display unit.

The customizable toy figure may further include a control unit disposed within at least a portion of the body to control at least one of a motion of at least a portion of the body, a sound emission, and content of the at least one story.

A computing device may perform at least one of controlling the control unit and updating the content of the at least one story.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates a front perspective view of a customizable toy figure including a book, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Customizable Toy Figure 100
Body 110
Head Portion 111
Face 111*a*
Hair 111*b*
Mouth 111*c*
Jaw Motor 111*d*
Eyes 111*e*
Eye Motor 111*f*
Torso Portion 112
Arm Portions 113
Hand Portions 114
Pelvic Portion 115
Leg Portions 116
Feet Portions 117
Toy Book 120
Pages 121
Toy Book Motor 122
Control Unit 130
Processing Unit 131
Communication Unit 132
Storage Unit 133
Audio Unit 134
Toy Book Button 140
Toy Book Wheel 150

FIG. 1 illustrates a front perspective view of a customizable toy FIG. 100 including a book 10, according to an exemplary embodiment of the present general inventive concept.

The customizable toy FIG. 100 may be constructed from at least one of metal, plastic, wood, glass, and rubber, etc., but is not limited thereto.

The customizable toy FIG. 100 may include a body 110, a toy book 120, a control unit 130, a toy book button 140, and a toy book wheel 150, but is not limited thereto.

The body 110 may be constructed to have a predetermined skin complexion. For example, the body 110 may have a skin complexion similar to African American individuals, such as dark, caramel, and fair. However, the body 110 may be of any complexion. Moreover, the body 110 may resemble a child in appearance. The body 110 may be adorned with an assortment of clothes based on a preference of a user. Furthermore, the body 110 may have a predetermined height. For example, the body 110 may be between nine to ten inches in height, but is not limited thereto.

The body 110 may include a head portion 111, a torso portion 112, a plurality of arm portions 113, a plurality of hand portions 114, a pelvic portion 115, a plurality of leg portions 116, and a plurality of feet portions 117, but is not limited thereto.

The head portion 111 may include a face 111*a*, hair 111*b*, a mouth 111*c*, a jaw motor 111*d*, a plurality of eyes 111*e*, and an eye motor 111*f*, but is not limited thereto.

The face 111*a* may resemble a face of a young child. The face 111*a* may have a smirking face, but is not limited thereto. The hair 111*b* may be disposed on a top surface of the head portion 111. The hair 111*b* may have a predetermined hairstyle. For example, the hair 111*b* may be similar to African American hairstyles. However, the hair 111*b* may be of any type of hairstyle.

The plurality of eyes 111*e* may include a camera and/or an optical character recognition (OCR) unit, but is not limited thereto.

The torso portion 112 may be rotatably disposed at a base of the head portion 111. Each of the plurality of arm portions 113 may be pivotally disposed on a side of the torso portion 112 substantially near the head portion 111. Each of the plurality of hand portions 114 may be pivotally disposed on each of the plurality of arm portions 113, respectively. As such, the body 110 may be moved to have a different pose. For example, the body 110 may stand and/or sit based on the preference of the user.

The toy book 120 may include a plurality of pages 121 and a toy book motor 122, but is not limited thereto.

The toy book 120 may be disposed on at least a portion of the body 110, such that the toy book 120 is oriented in a first direction toward the face 111*a*. The plurality of pages 121 may display at least one story entertaining to the user thereupon. For example, the at least one story may be at least one non-fictional story, but is not limited thereto. The at least one story may include the story of the customizable toy FIG. 100 to encourage the user to read and/or identify with the customizable toy FIG. 100. Moreover, the user may learn new vocabulary from the story. The user may move each of the plurality of pages 121 in a first direction or a second direction from a first side of the toy book 120 to a second side of the toy book 120. As such, the user may read the story disposed on at least a portion of each of the plurality of pages 121.

The control unit 130 may include a processing unit 131, a communication unit 132, a storage unit 133, and an audio unit 134, but is not limited thereto.

The processing unit 131 (or central processing unit, CPU) may include electronic circuitry to carry out instructions of a computer program by performing basic arithmetic, logical, control and input/output (I/O) operations specified by the instructions. The processing unit 131 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 131 may also include a microprocessor and a microcontroller.

The communication unit 132 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The storage unit 133 may include a random access memory (RAM), a read-only memory (ROM), a hard disk, a flash drive, a database connected to the Internet, cloud-based storage, Internet-based storage, or any other type of storage unit.

The audio unit 134 may include a speaker, but is not limited thereto.

The toy book button 140 may be depressed by the user to move at least one page of the plurality of pages 121. Specifically, the toy book motor 122 may rotate in response to the toy book button 140 being depressed. The at least one page of the plurality of pages 121 may move in response to the rotation of the toy book motor 122. Furthermore, the plurality of pages 121 may return to a beginning of the plurality of pages 121 in response to the toy book button 140 being depressed when the plurality of pages 121 has reached the last of the plurality of pages 121.

Alternatively, the customizable toy FIG. 100 may aurally read the at least one story in response to the toy book button 140 being depressed a first predetermined number of times and/or for a first predetermined duration of time. Specifically, the plurality of eyes 111*e* may perform OCR on each character and/or word disposed on each of the plurality of pages 121. The storage unit 133 may store a plurality of words therein. The plurality of eyes 111*e* may transmit each OCR character to the processing unit 131 of the control unit 130 to determine an OCR word. The processing unit 131 may retrieve at least one of the plurality of words from the storage unit 131 to compare the OCR word thereto. Additionally, the processing unit 131 may send a sound command to the audio unit 134 to emit a sound of the OCR word. In other words, the toy FIG. 100 may aurally read the at least one story based on the OCR of each word of the story.

Moreover, the processing unit 131 may send a speak command to the jaw motor 111*d* and a read command to the eye motor 111*f*. The jaw motor 111*d* may rotate in response to the speak command from the processing unit 131. The mouth 111*c* of the head portion 111 may move in response to the rotation of the jaw motor 111*d*. As such, the mouth 111*c* may move in synchrony with the sound of the OCR word from the audio unit 134, such that the mouth 111*c* may utter the OCR word.

Simultaneously, the eye motor 111*f* may rotate in response to the read command from the processing unit 131. The plurality of eyes 111*e* of the head portion 111 may move in response to the rotation of the eye motor 111*f*. As such, the plurality of eyes 111*e* may perform OCR on each character and/or word disposed on each of the plurality of pages 121.

The plurality of eyes 111*e* may stop performing OCR in response to reaching an end of at least one of the plurality of pages 121. The processing unit 131 may send a next page command to the toy book motor 122 in response to the plurality of eyes 111*e* reaching the end of at least one of the plurality of pages 121. As such, the toy book motor 122 may rotate in response to the next page command from the processing unit 131. At least one of the plurality of pages 121 may move to display another of the plurality of pages 121 in response to the rotation of the toy book motor 122.

Furthermore, the processing unit 131 may send a reset command to the toy book motor 122 in response to the plurality of eyes 111*e* reaching the end of the plurality of pages 121. As such, the toy book motor 122 may rotate in response to the reset command from the processing unit 131, such that the plurality of pages 121 may return to the beginning of the plurality of pages 121.

Alternatively, the storage unit 133 may store the at least one story as disposed on the plurality of pages 121 of the toy book 120. Additionally, the at least one story stored on the storage unit 133 may be the same as the at least one story as disposed on the plurality of pages 121 of the toy book 120.

Therefore, the control unit 130 may control at least one of a motion of at least a portion of the body 110, a sound emission from the audio unit 134, and content of the at least one story from the storage unit 133.

Alternatively, the plurality of pages 121 may be a display unit 121, such that the display unit 121 may include a plasma screen, an LCD screen, a light emitting diode (LED) screen, an organic LED (OLED) screen, a computer monitor, a hologram output unit, or any other type of device that visually displays data.

As such, the display unit 121 may display the at least one story thereupon, as described above with respect to the plurality of pages 121. Moreover, the user may depress the toy book button 140 a second predetermined number of times and/or for a second predetermined duration of time, such that the processing unit 131 may retrieve another at least one story from the storage unit 133 to be displayed on the display unit 121. Also, the processing unit 131 may send a digital sound command to the audio unit 134 to emit a sound of the another at least one story. Additionally, the plurality of eyes 111*e* may optionally perform OCR due to the another at least one story being retrieved from the storage unit 133. In other words, the toy FIG. 100 may read the another at least one story based on content from the storage unit 133 instead of using OCR.

The user may depress the toy book button 140 a third predetermined number of times and/or for a third predetermined duration of time, such that the toy book 120 may rotate to at least partially oriented in a second direction away from the face 111*a*, such that the user may read each of the plurality of pages 121 without obstruction from at least a portion of the body 110.

The toy book wheel 150 may be disposed on at least a portion of the body 110. The toy book wheel 150 may be rotated in a first direction (i.e. clockwise) or a second direction (i.e. counterclockwise) to move the at least one story displayed on the display unit 121 in a first vertical direction (i.e. up) or a second vertical direction (i.e. down), such that the user may view any additional portions of the at least one story. In other words, the toy book wheel 150 may be rotated to scroll the at least one story on the display unit 121. Alternatively, the display unit 121 may be a touch-screen, such that the user may scroll the screen by tapping the screen and moving a finger across the display unit 121.

The computing device 10 may include an input unit 11, display unit 12, a processing unit 13, a communication unit 14, and a storage unit 15.

The input unit 11 may include a keyboard, a touchpad, a mouse, a trackball, a stylus, a voice recognition unit, a visual data reader, a camera, a wireless device reader, and a holographic input unit.

The display unit 12 may include a plasma screen, an LCD screen, a light emitting diode (LED) screen, an organic LED (OLED) screen, a computer monitor, a hologram output unit, a sound outputting unit, or any other type of device that visually or aurally displays data.

Also, the display unit 12 may be combined with the input unit 11 to be a touch-screen.

The processing unit 13 (or central processing unit, CPU) may include electronic circuitry to carry out instructions of a computer program by performing basic arithmetic, logical, control and input/output (I/O) operations specified by the instructions. The processing unit 13 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 13 may also include a microprocessor and a microcontroller.

The communication unit 14 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The storage unit 15 may include a random access memory (RAM), a read-only memory (ROM), a hard disk, a flash drive, a database connected to the Internet, cloud-based storage, Internet-based storage, or any other type of storage unit.

For ease of description, the computing device 10 will be hereinafter interpreted to be a smart phone with a touchscreen.

The computing device 10 may access the Internet via the communication unit 14 to allow the user to access a website, and/or may allow a program and/or an application to be executed using the processing unit 13. For ease of description, the program and/or the application will hereinafter be referred to as an app. The app may be downloaded from the Internet to be stored on the storage unit 15. Moreover, the app may be designed to control the control unit 130.

After executing the app, the user may perform any of the functions as described above with respect to the control unit 130. Additionally, the user may depress a button rendered on the display unit 12 to download at least one other story from the Internet using the communication unit 14. The processing unit 11 may store the at least one other story on the storage unit 15. Subsequently, the user may depress another button the display unit 12, such that the processing unit 11 may retrieve the at least one other story from the storage unit 15 and sends the at least one other story to the communication unit 14. The communication unit 14 may send the at least one other story to the communication unit 132 of the control unit 130. The communication unit 132 may send the at least one other story to the processing unit 131. The processing unit 131 may store the at least one other story on the storage unit 133 of the control unit 130. In other words, the app on the computing device 10 may update and/or install the at least one other story on the toy FIG. 100.

The customizable toy FIG. 100 may be customized with additional accessories, such as a purse, a bag, braids, barrettes, a ponytail, and/or hair locks. The customizable toy FIG. 100 may include a piece of clothing and/or any other item associated with the at least one story. The customizable toy FIG. 100 may be suitable for any age of child, but may also be targeted for a specific age range. For example, the customizable toy FIG. 100 may be customized for young girls between six and twelve in age.

Therefore, the customizable toy FIG. 100 may improve reading skills, enhance self-esteem, and foster creativity, but is not limited thereto. Moreover, the customizable toy FIG. 100 may include a letter from the customizable toy FIG. 100 for the user to create a bond between the user and the customizable toy FIG. 100.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A customizable toy figure, comprising:
a body, comprising:
a mouth disposed on at least a portion of the body, and
a plurality of eyes disposed on at least a portion of the body, each of the plurality of eyes comprising:
an OCR unit to perform OCR on each word of at least one story, such that the mouth utters the word in response to the OCR; and
a toy book disposed on at least a portion of the body to entertain a user with the at least one story, such that the toy book is oriented in a first direction toward at least a portion of the body, such that the at least one story moves in a first vertical direction or a second vertical direction to display additional portions of the at least one story.

2. The customizable toy figure of claim 1, wherein the toy book comprises:
a plurality of pages disposed within at least a portion of the toy book to display the at least one story thereupon.

3. The customizable toy figure of claim 2, further comprising:
a toy book button disposed on at least a portion of the body to move at least one of the plurality of pages in response to the toy book button being depressed.

4. The customizable toy figure of claim 3, wherein the toy book rotates to be at least partially oriented in a second direction in response to the toy book button being depressed.

5. The customizable toy figure of claim 1, wherein the body further comprises:
an eye motor disposed within at least a portion of the body to at least partially move each of the plurality of eyes in response to a rotation of the eye motor.

6. The customizable toy figure of claim 1, wherein the body further comprises:
a jaw motor disposed within at least a portion of the body to at least partially move the mouth in response to a rotation of the jaw motor.

7. The customizable toy figure of claim 1, wherein the toy book comprises:
a display unit disposed within at least a portion of the toy book to display the at least one story thereupon.

8. The customizable toy figure of claim 7, further comprising:
a toy book wheel disposed on at least a portion of the body to at least partially scroll content on the display unit.

9. The customizable toy figure of claim 1, further comprising:
a control unit disposed within at least a portion of the body to control at least one of a motion of at least a portion of the body, a sound emission, and content of the at least one story.

10. The customizable toy figure of claim 9, wherein a computing device performs at least one of controlling the control unit and updating the content of the at least one story.

11. A customizable toy figure, comprising:
a body, comprising:
a mouth disposed on at least a portion of the body, and
a plurality of eyes disposed on at least a portion of the body, each of the plurality of eyes comprising:
an OCR unit to perform OCR on each word of at least one story, such that the mouth utters the word in response to the OCR; and
a toy book disposed on at least a portion of the body to entertain a user with the at least one story, such that the toy book is oriented in a first direction toward at least a portion of the body, the toy book comprising:

a plurality of pages disposed within at least a portion of the toy book to display the at least one story thereupon.

\* \* \* \* \*